(12) United States Patent
Döttling et al.

(10) Patent No.: US 7,593,363 B2
(45) Date of Patent: Sep. 22, 2009

(54) DATA TRANSMISSION METHOD

(75) Inventors: Martin Döttling, Neubiberg (DE);
Bernhard Raaf, Neuried (DE)

(73) Assignee: Nokia Siemens Networks GmbH & Co. KG, Munich (DE)

(*) Notice: Subject to any disclaimer, the term of this patent is extended or adjusted under 35 U.S.C. 154(b) by 634 days.

(21) Appl. No.: 10/555,535

(22) PCT Filed: Apr. 21, 2004

(86) PCT No.: PCT/EP2004/050576

§ 371 (c)(1),
(2), (4) Date: Nov. 4, 2005

(87) PCT Pub. No.: WO2004/100589

PCT Pub. Date: Nov. 18, 2004

(65) Prior Publication Data

US 2006/0285558 A1 Dec. 21, 2006

(30) Foreign Application Priority Data

May 6, 2003 (DE) ................................ 103 20 156
Feb. 5, 2004 (DE) ....................... 10 2004 005 714

(51) Int. Cl.
*H04Q 7/00* (2006.01)
(52) U.S. Cl. ...................... 370/328; 370/329; 370/332; 370/336; 370/345; 455/69
(58) Field of Classification Search .................. 455/69, 455/509, 450, 452.2, 517; 370/328–329, 370/332–348, 252, 277–278, 310, 326
See application file for complete search history.

(56) References Cited

U.S. PATENT DOCUMENTS

| | | | |
|---|---|---|---|
| 6,594,241 B1 * | 7/2003 | Malmlof | 370/329 |
| 2001/0034236 A1 * | 10/2001 | Tong et al. | 455/450 |
| 2001/0053140 A1 | 12/2001 | Choi et al. | |
| 2002/0141362 A1 | 10/2002 | Hsu et al. | |

(Continued)

FOREIGN PATENT DOCUMENTS

DE        692 23 961 T2        6/1992

(Continued)

OTHER PUBLICATIONS

3GPP TSG RAN WG1 31: "Tdoc R1-03-0286 Text proposal on CQI Enhancements for TR on HSDPA Enhancements" TSG-RAN WG1 #31, XX, XX, Feb. 18, 2003, Seiten 1-7, XP002312853 das ganze Dokument.

(Continued)

*Primary Examiner*—Kamran Afshar
(74) *Attorney, Agent, or Firm*—Laurence A. Greenberg; Werner H. Stemer; Ralph E. Locher (57) ABSTRACT

A method for transmitting data via a data transmission channel in a communication network. The transmission channel is made available for the wireless transmission between a transmitter and a receiver. The data transmission is carried out while taking into consideration the channel quality in such a manner that the channel quality data available during transmission is as current as possible and no unnecessary transmission of channel quality data is required.

17 Claims, 3 Drawing Sheets

U.S. PATENT DOCUMENTS

| | | | |
|---|---|---|---|
| 2002/0168944 A1 | 11/2002 | Terry et al. | |
| 2002/0191573 A1* | 12/2002 | Whitehill et al. | 370/338 |
| 2003/0031119 A1 | 2/2003 | Kim et al. | |
| 2003/0072395 A1 | 4/2003 | Jia et al. | |
| 2003/0081572 A1 | 5/2003 | Kim et al. | |
| 2003/0086393 A1* | 5/2003 | Vasudevan et al. | 370/330 |
| 2003/0123396 A1* | 7/2003 | Seo et al. | 370/252 |
| 2003/0129989 A1* | 7/2003 | Gholmieh et al. | 455/452 |
| 2003/0148770 A1* | 8/2003 | Das et al. | 455/455 |
| 2003/0223400 A1* | 12/2003 | Knisely et al. | 370/346 |
| 2003/0235162 A1* | 12/2003 | Chao et al. | 370/329 |
| 2004/0066754 A1* | 4/2004 | Hottinen | 370/252 |
| 2004/0114618 A1* | 6/2004 | Tong et al. | 370/431 |
| 2004/0219920 A1* | 11/2004 | Love et al. | 455/442 |
| 2005/0094561 A1* | 5/2005 | Raaf | 370/329 |
| 2006/0133402 A1* | 6/2006 | Dottling et al. | 370/431 |
| 2008/0069058 A1* | 3/2008 | Geng et al. | 370/336 |
| 2009/0033524 A1* | 2/2009 | Tiirola et al. | 375/295 |

FOREIGN PATENT DOCUMENTS

| | | |
|---|---|---|
| DE | 0 889 664 A | 1/1999 |
| DE | 1 304 900 A | 4/2003 |
| EP | 0 889 664 A2 | 1/1999 |
| EP | 0 991 222 A1 | 4/2000 |
| EP | 0 727 891 B1 | 2/2003 |
| EP | 1 304 900 A2 | 4/2003 |
| WO | WO 99/41872 | 8/1999 |
| WO | WO 02/067461 A1 | 8/2002 |

OTHER PUBLICATIONS

3GPP TSG RAN WG1 31 et al: "Tdoc R1-030254 Evaluation of CQI feedback schemes" TSG-RAN WG1 #31, XX, XX, Feb. 18, 2003, Seiten 1-8, XP002312852 das ganze Dokument.

3GPP TSG RAN WG1 31: "Tdoc R1-03-0286 Text proposal on CQI Enhancements for TR on HSDPA Enhancements", TSG-RAN WG1 #31, XX, XX, Feb. 18, 2003, pp. 1-7, XP002312853 (whole document).

3GPP TSG RAN WG1 31: "Tdoc R1-03-0286 HSDPA Link Level Results for TR25.895", TSG RAN WG1 #31, XX, XX, Feb. 18, 2003.

3GPP TSG RAN WG1 31 et al.: "Tdoc R1-030254 Evaluation of CQI feedback schemes", TSG-RAN WG1 #31, XX, XX, Feb. 18, 2003, pp. 1-8, XP002312852 (whole document).

\* cited by examiner

DATA TRANSMISSION METHOD

FIELD OF TECHNOLOGY

The present disclosure relates to a method for transmitting data by way of a data transmission channel in a communications network, which is made available between a transmitter and a receiver by way of a radio path.

BACKGROUND

The efficiency of a data transmission from a transmitter to a receiver depends substantially on current information regarding the transmission quality of the data transmission channel used being available at the transmitter at the correct time. Only then can the transmitter match send parameters for the data due to be sent to the current situation in order to achieve satisfactory transmission results. Send power or modulation or coding scheme are regarded as send parameters, for example. The current information regarding the transmission quality is obtained from so-called "channel measurements" or "channel estimates".

The problem with conventional data transmission is illustrated by way of an example using the UMTS standard (UMTS: Universal Mobile Telecommunication System). Refer to the description of the figures for explanations of terms used.

For UMTS, a packet,switched high-speed data transmission method has been proposed for a shared usage channel, the so-called HSDPA (High Speed Downlink Packet Access) method. Using this method, the receiver is a terminal and the transmitter is a base station. HSDPA provides for a slow signaling of control information through higher layers of the OSI layer model (OSI: Open System Interconnection), which controls the channel measurements for HSDPA.

The control information used for these channel measurements includes principally the timing rate for the measurements, the timing offset (displacement) with respect to a reference and the number of retries during the transmission of a measurement value. This means that after a radio connection or "radio link" has been established measurements are carried out at a fixed rate, regardless of whether and when data is actually sent on the shared downlink data channel HSD-SCH (High Speed Downlink Shared Channel) set up for HSDPA.

Therefore, on the one hand, under certain circumstances a large number of unnecessary measurements are performed, while on the other hand there may be no current measurement present at the time of an actual packet data transmission, the so-called "packet call". In this situation, a packet data transmission can include a plurality of individual packet calls which can in turn each comprise a plurality of individual data packets.

As a remedy, it has previously been proposed to take additional information about the status of the radio channel from the power control facility. This is, however, not possible for the situation where the terminal is running in so-called "soft handover" mode because it results in problems with the power control facility. "Soft handover" is understood to be a status in which a terminal is connected to a plurality of base stations. In this situation, the power is controlled such that the mobile station or the terminal is able to correctly receive the sent data with the aid of the signals received from all the base stations.

However, this does not generally mean that the terminal correctly receives the signal from the particular base station that sends out the HSDPA data. Since the HSDPA data packets are sent only by this one base station to the mobile station, the power control facility that is optimized for a set of base stations does not delivery any satisfactory additional information.

The following proposed prior art methods have therefore been put forward to solve the problems associated with current channel information data:

1. A so-called activity based channel quality information acknowledgment (activity based CQI feedback, CQI: Channel Quality Information). In this situation, the rate of cyclical measurements is increased as soon as the terminal device or terminal detects that data is being sent. With regard to a packet data transmission in accordance with HSDPA, an additional channel information message CQI can be sent particularly with each feedback indicating whether or not it has been possible to decode a received packet. This feedback can for example be a so-called "ACK"(Acknowledgment) or "NAK" ("No Acknowledgment").

However, since a delay exists between the time when data activity is determined at the terminal, when the measurement is carried out and transmitted, and when the measurement is received and evaluated in the transmitter(in other words the base station), there are disadvantageous results for each packet data transmission. More specifically, for each packet data transmission the first packets have to be transmitted without a current channel information message or channel measurement. Furthermore, during an active data transmission, an unnecessarily large number of channel information messages are sent under certain circumstances due to the increased send rate for the channel information message, as a result of which unnecessary interference is generated in the uplink direction.

2. Another proposed method involves sending an additional channel information message after receiving a NAK. However, the same disadvantages occur here as described above.

3. Another method has been proposed whereby a channel information message is specifically requested. Although this allows this solves the problem associated with the absence of current information at the start of a data transmission (the explicit signaling on the HS-SCCH), the control channel for HSDPA does however result in an additional usage of resources in the downlink direction. It is also disadvantageous that delayed initial sending of the first packet of a packet data transmission occurs as a result of the explicit request operation.

4. Yet another method includes the terminal sending an additional channel information message precisely at the time when the terminal determines during the decoding process for example that the currently applied coding or modulation scheme is too good or too bad. For data links which are already active, this method ensures that channel information messages occur precisely at the time they are required and whenever they are required. A disadvantage of this method however is that the receiver of these channel information messages (in other words the base station in the case of HSDPA) does not know the points in time at which the channel information messages have been sent. As a result, detection and decoding of these messages is made more difficult.

To summarize, the disadvantages shared by all the proposed prior art methods is that it is not possible to simultaneously have access to current channel information and operate in a resource-efficient manner.

SUMMARY

Accordingly, a method for data transmission in which current channel quality information is guaranteed while minimizing resource usage, is proposed.

The invention is based on the idea that the most current possible channel quality information is available at the transmitter without channel quality information being transferred unnecessarily.

In an exemplary embodiment, a wireless data transmission channel is made available with regard to a method for wireless data transmission between a transmitter and a receiver in a communications system. In order to allow the transmitter to send the data matched to the current channel quality of the data transmission channel, channel quality information is transmitted repeatedly from the receiver to the transmitter. The receiver or the transmitter determines an activity status for the data transmission (in other words for example whether data is currently being transferred or its transfer is being signaled), whether no data is being transferred, and if no arrival of data is being signaled. Furthermore, the time interval from a previous transfer is ascertained. If this time interval exceeds a certain first time interval and at the same time a certain activity status exists (in particular the beginning or the existence of a data transmission), then a channel information message is sent by the receiver to the receiver.

Exceeding the first time interval to another transfer ensures that there is no transfer of an unnecessarily large number of channel information messages. In addition, this method also has the advantage that the point in time at which further channel quality information is transferred and thus arrives at the transmitter is at least approximately known to the transmitter. Namely, because this point in time correlates with an action by the transmitter, i.e, the beginning of a data transmission operation for example. In this embodiment, the first time interval represents a maximum interval, whereby further channel quality information is transferred when the latter is exceeded.

As an alternative to defining a minimum time interval, it is possible to specify that the transfer of the further channel quality information takes place only after the defined activity status has already existed n times. This has the advantage that the number of channel quality information messages transferred may be reduced according to whether or not data transmissions are taking place. A further alternative includes taking into account timings for the transfer such that no collisions occur between individual transmissions of channel quality information.

In this way, the number of messages transferred containing channel quality information can be reduced, in line with the transmission situation. Furthermore, this alternative has the advantage that no minimum time interval needs to be ascertained or defined. The data transmission can in particular take place in packet switched fashion or, in the case of a circuit switched connection, the quality can be easily selected in stepwise fashion.

According to another exemplary embodiment, the communications network in question can be a mobile radio network, in particular one according to the UMTS standard. The transmitter in question can be a fixed base station and the receiver a mobile terminal. In particular, such a type of data transmission method can be used for HSDPA. Similarly, the terminal can represent the transmitter and the base station the receiver. This data transmission method can then be applied in particular to a high-speed transmission in the uplink direction from the terminal to the base station, for example HSUPA (High Speed Uplink Packet Access) or EUDCH (Enhanced Uplink Dedicated Channel).

In order to match the transfer to the activity status of the data transmission, the first time interval can be defined depending on the in activity status. In particular, different activity statuses are provided for the beginning of a data transmission and a data transmission in progress and no "active" data transmission. "Active" in this situation means that it is not exclusively control data that is transmitted but also user data. If no active data link is provided, a certain first time interval is selected. This first time interval can then be reduced at the beginning of a data transmission in order that current channel quality information is initially present at the transmitter.

Once data transmission is in progress, this first time interval can be increased in order to be further increased after the data transmission to a greater value as mentioned at the beginning. It is also possible to provide a repeat (in particular cyclical transfer of channel quality information at certain points in time) to which further measurements defined by the above conditions are added. The point in time for the repeat (in particular cyclical measurements) can be predefined by the communications network. As a result, unnecessary interference effects between receivers, terminals in particular, can be avoided.

In yet another exemplary embodiment, if the time interval from the previous transfer exceeds the first time interval the time interval to a following transfer whose point in time is already known, in other words transfers at predefined points in time, is ascertained. Only if this time interval also exceeds a defined second time interval will a further transfer of channel quality information be performed. This second time interval can also be defined depending on the activity status of the data transmission. Additionally, a wireless data transmission channel can be formed by a radio link or also by means of an optical transmission.

The disclosure of the invention also includes a references to a terminal, a base station and a communications network, with which or by means of which this method is performed.

BRIEF DESCRIPTION OF THE DRAWINGS

The various object, advantageous and novel features of the present invention will be more readily apprehended from the following Detailed Description and when read in conjunction with the enclosed drawings, in which.

Before proceeding with a detailed description of the figures, there first follows an explanation of terms and reference characters used:

A communications system or communications network is a structure for exchanging data. In this situation, the structure can for example be a cellular mobile radio network, such as the GSM network (Global System of Mobile Communications) or the UMTS network (Universal Mobile Telecommunications System). A communications network comprises at least two connection nodes, in other words so-called "point to point" connections are thus also included under this concept.

In a communications system, terminals and base stations are generally provided which establish a connection with one another by way of a radio interface. In UMTS, the communications system or radio transmission network comprises at least base stations, here also referred to as NodeB, and also radio network control units or radio network controllers (RNC) for connecting the individual base stations. The terrestrial radio access network or "Universal Terrestrial Radio Access Network" UTRAN is the radio engineering section of a UMTS network in which for example the radio interface is also made available. A radio interface is always standardized and defines the totality of the physical and protocol related provisions for the data exchange, for example the modulation method, the bandwidth, the frequency deviation, access method, protection procedures or also switching technologies. The UTRAN thus includes at least base stations and also at least one RNC.

A base station is a central unit in a communications network, which in the case of a cellular mobile radio network supports terminals or communication terminal devices within a cell of the mobile radio network by way of one or more radio channels. The base station provides the air interface between base station and terminal. It handles the management of the radio operation with the mobile users and monitors the physical radio link. Furthermore, it transmits to the user and status messages to the terminals. The base station has no switching function but simply a supply function. A base station includes at least one transmit/receive unit.

A terminal can be any desired communication terminal device which a user uses to communicate in a communication system. These include for example mobile radio terminal devices such as mobile telephones or portable computers equipped with a radio module. A terminal is frequently also referred to as "mobile station" (MS) or in UMTS as "user equipment" (UE).

In mobile radio, two connection directions are differentiated. The downward connection or "downlink" (DL) denotes the transmission direction from the base station to the terminal. The upward connection or "uplink" (UL) denotes the opposite transmission direction from the terminal to the base station. In wideband transmission systems, such as a UMTS mobile radio network for example, a channel is a sub-area of an overall available transmission capacity. A wireless communications path is designated as the radio channel within the scope of this application.

In a mobile radio system, UMTS for example, there are two types of physical channels for the transmission of data: permanently assigned ("dedicated") channels and jointly used (common) channels. With regard to the dedicated channels, a physical resource is reserved only for the transmission of information for a particular terminal. With regard to the common channels, information items can be transmitted that are intended for all the terminals, for example the primary common physical control channel or "Primary Common Control Physical Channel" (P-CCPCH) in the downlink direction, or else all the terminals share one physical resource. This is the case with regard to HS-PDSCH, which is used for sending data to a terminal depending on the quality of the link with the terminal.

In mobile radio systems such as UMTS for example, in addition to circuit switched services in which a connection is permanently allocated for its duration, packet switched services are also provided. Circuit switched services can also be executed discontinuously.

LIST OF REFERENCE CHARACTERS

S: Transmitter
R: Receiver
CN: Communications network
CHI: First channel link
CH2: Second channel link
First data transmission
Second data transmission
Third data transmission
CQI-TX: Regular transfer of channel quality information
TS: Time slot
MP: Measurement period
TB: Transport block
AN: Acknowledgment

DETAILED DESCRIPTION OF THE DRAWINGS

Figure 1:
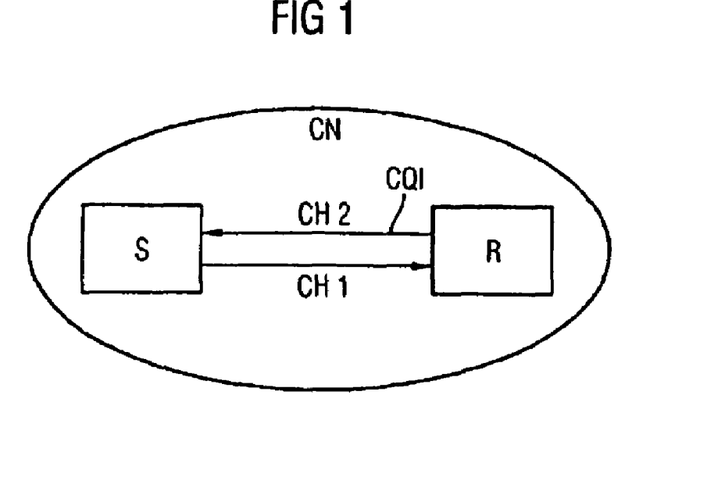
FIG. 1 illustrates the schematic relationship between transmitter, receiver and network in accordance with an exemplary embodiment.

In the figures, elements with the same reference characters are the same elements and have the same function. FIG. 1 illustrates a transmitter S and a receiver R in a communications system CN. The transmitter S sends data to the receiver R by way of a first channel link CH1. The receiver R can send data to the transmitter S by way of a second channel link CH2.

The transmitter S can for example be a base station, and the receiver R a terminal. The communications network system in question can for example be a system in accordance with UMTS, GSM or other standards. The first channel link CH1 can include a plurality of channels, for example a data transmission channel for transmitting user data, or "load bits", and also a control channel for transmitting control information. The second channel link CH2 can include only a control channel or, in the same way as the first channel link CH1, it can include a control channel and a data transmission channel.

With regard to the transmission of user data over the data transmission channel of the first channel link CH1 (from the transmitter to the receiver), it is important that the channel quality of this data transmission channel be known. To this end, the receiver (in other words the terminal for example) ascertains channel quality information CQI from data for the first channel link. The receiver R can also ascertain this channel quality information from data from common control channels. In the case of HSDPA, this would for example be the Common Pilot Channel CPICH in this situation. This channel quality information CQI is transferred by the receiver R to the transmitter S, for example by way of the control channel of the second channel link CH2.

It is important to note that for the data transmission over the first channel link CH1 that the channel quality information CQI present at the transmitter S be as current as possible. At the same time, channel quality information CQI should not be sent unnecessarily since this, as stated previously, results in interference effects. Therefore, within the scope of the invention, coordination of the timing of the transfer of this channel quality information CQI is proposed.

Figure 2:
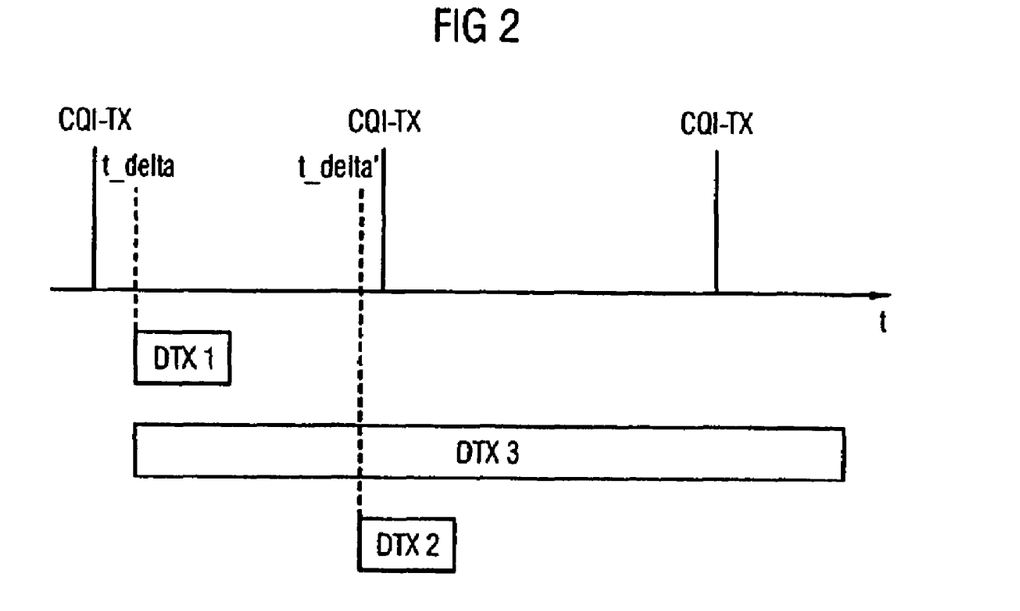
FIG. 2 illustrates the timing sequence of transfers of the channel quality information and data transmission in accordance with an exemplary embodiment.

FIG. 2 illustrates an example of the timing coordination under the constraint that there are regular, predefined transfers of channel quality information CQI. In FIG. 2, a time axis labeled T and the regular transfers CQI-TX take place at certain points in time. As illustrated, a first data transmission DTX1 is to take place. To this end, a check is made as to whether the time interval t delta between the first data transmission DTX1 and a regular transfer CQI-TX is greater than a defined first time interval. If this is the case, then the transmitter additionally sends the channel quality information CQI to the receiver.

A general check is carried out as to whether a minimum time interval from the previous measurement or to the next known measurement is exceeded. This can be seen in the second data transmission DTX2, where the time interval t_delta' to the following channel quality information transfer CQI-TX is determined. A data transmission can also, as illustrated by the third data transmission DTX3, extend across a plurality of regular channel quality information transfers CQI-TX. For the duration of the transfer, care is taken to ensure that no further transfer of channel quality information occurs which takes place too close in time to regular transfers.

In order to differentiate the statuses "Start of a data transmission" and "Data transmission in progress", (in the case of a packet switched data transmission or a discontinuous circuit-switched transmission), the period of time since the point in time of the last transmission of a data packet or the length of the pause can be used. If this period of time is greater than a predefined value, which is referred to as inactivity time in the following, then this denotes the "Start of a data transmission". It is thus also possible to specify a transition criterion between both statuses.

This inactivity time is preferably chosen to be greater than a "round trip delay". "A round trip delay" is understood to be the time that is required to decode a message sent by the transmitter in the receiver. The round trip delay is used to notify the transmitter of the result of this decoding, which the transmitter then also decodes again in order to then send the message one further time depending on this result.

The choice of the period of time greater than a round trip delay has the following background: If the last packet of a packet switched data transmission or of a "packet call" requires a plurality of transmissions as a result of an inadequate receive quality, then there is always a time interval equal to at least one round trip delay. This is because the transmitter of the data packet cannot know beforehand that the packet could not be received. If the period of time is now chosen to be greater than one round trip delay, then this case of the packet of a data transmission being sent repeatedly will not be erroneously classed as the start of a new data transmission.

This arrangement can be used in particular for HARQ (Hybrid Automatic Repeat Request) methods, for HSDPA for example where the round trip delay is typically equal to six transmission time intervals TTI. With HSDPA, a TTI defines a time interval within which a base station sends to a terminal. The round trip delay also depends, as described, on the response speed of the base station, which in contrast to the response speed of the mobile station is not standardized. The response speed can be chosen by each manufacturer according to the capabilities of the implementation used. It can therefore be necessary to choose the period of time depending on the base station currently in use and to notify this to the mobile station. Furthermore, terminals are provided that are not capable of receiving data by way of HSDPA in each transmission time interval TTI. In this case, the inactivity time is preferably matched to the round trip delay changed thereby.

Figure 3:
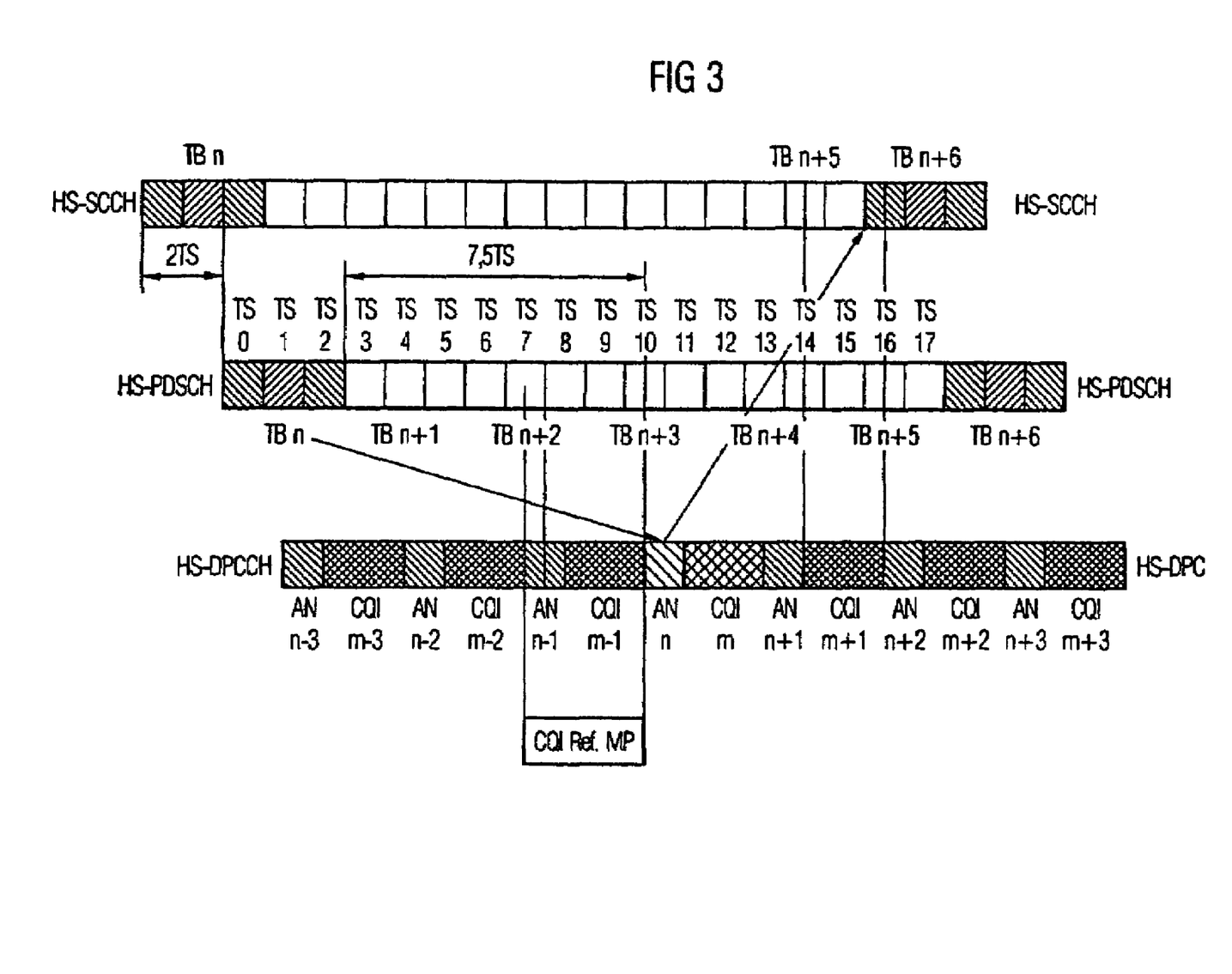
FIG. 3 illustrates the timing sequence of a signaling process in HSDPA in accordance with an exemplary embodiment.

The invention will next be described in detail in the following with reference to examples on HSDPA. However, the invention can also be used for example with regard to a corresponding high speed transmission method in the uplink direction, such as methods according to HSUPA or EUDCH. FIG. 3 illustrates the timing sequence of the signaling process in HSDPA. In the downlink direction, control information is sent on the so-called "High Speed Shared Control Channel" HS-SCCH. Two timeslots later, the transmission of the actual data or user data begins on the associated data transmission channel, the "High-Speed Physical Downlink Shared Channel" HS-PDSCH. An arrow serves to indicate when the associated feedback message AN concerning correct decoding (ACK) or incorrect decoding (NAK) occurs from the terminal in the uplink direction to the base station. This confirmation or feedback AN is identified in the drawing by a continuous index n and by hatching. The duration of the measurement of the data for the channel quality information CQI is referred to as the measurement period MP.

The second arrow from the feedback message AN, n in the HS-DPCCH to the HS-SCCH indicates the point in time from which this confirmation is present again at the transmitter, in other words, the base station, and thus a corresponding response is able to occur on the HS-SCCH. The points in time from which a response is possible are shaded gray for the HSPDSCH and HS-SCCH.

With regard to this embodiment, three different reasons are now used for transferring the channel quality information or "CQI feedback": 1. CQI feedbacks, in particular those cyclically recurring, predetermined by the communications network. The predetermination can in particular be carried out by a central unit such as the base station or RNC. A predetermination by the base station has the advantage that the radio traffic can be controlled in a simple manner with respect to interference effects within a radio cell. With regard to control using the RNC, control can also be implemented in respect of a plurality of radio cells.

2. Additional CQI feedbacks at the start of a data transmission.

3. Additional CQI feedbacks during an active data transmission.

According to the above, time intervals are now defined for the reasons in 2 and 3, which determine time interval CQI feedbacks at least with respect to the cyclical CQI feedbacks. Optionally, control can be exercised such that predetermined CQI feedbacks are transmitted with top priority. This priority arrangement can be controlled globally for example by the termination, postponement or a temporary ban on CQI feedbacks according to 2 and 3. Alternatively, the priority arrangement can be controlled depending on parameters that relate to the data traffic.

In the different statuses different conditions can be chosen for sending out CQI feedbacks. For example, CQI feedbacks can be sent at the start of a data transmission directly after the terminal has detected this status, whereas otherwise only (for example according to method 2 of the prior art) CQI feedbacks are sent only when a NACK has been sent. In the exemplary embodiment, the first CQI feedback can be sent earlier than in the case of the prior art method 2, in other words not just at the point in time m as shown in FIG. 3 but actually earlier. For example at the points in time m−1 or m−2, and in an extreme case even the point in time m−3. One advantage is that the transmitter is already provided with current channel status information one to two, and in an extreme case even three, packets earlier (than for example in the case of prior art method 2) and the data throughput in particular for shorter data transmissions can improve noticeably. This improvement could however also be applied to method 1, something which has not yet previously been described. This method can also be combined with prior art method 1, both individually and also in combination with other embodiments disclosed herein.

A maximum number of CQI feedbacks can optionally be defined at the start of a data transmission. This exemplary embodiment variant is advantageous when the first CQI feedback sent at the start of a data transmission is lost, in other words cannot be received correctly. The information is nevertheless then available at the transmitter by means of a further CQI sent. Alternatively, a smaller time interval with respect to preceding CQI feedbacks can be chosen at the start of a data transmission than during an active data transmission. In this situation, the start of a data transmission must not of course be defined as the first TTI in which a data packet has been transferred after no data packets have been transferred during a predefined time (inactivity time). Rather, this status must continue to apply after this first TTI for a certain predefined time (referred to in the following as hold time) until a switch occurs to the active data transmission status or possibly to the no data transmission status if no further data packets have been sent and the hold time has been chosen to be greater than the inactivity time.

By checking whether minimum intervals from the previous and following cyclical CQIs have been exceeded, it is additionally possible to prevent the sending of an unnecessarily large number of feedbacks. In particular, however, this means that it is also possible to ensure that in the event of multiple transmissions of a CQI feedback such repeated transmissions do not overlap with the subsequent transmissions of the next ascertained channel quality information. If the transmission conditions are such that the transmission of a CQI feedback in the uplink direction is not well secured, then the possibility exists to send the CQI feedbacks repeatedly, in other words exactly the same CQI feedback several times in succession. The transmitter can then take into account all the received copies during the decoding and thus has a better probability of being able to correctly decode the CQI feedback than if only one copy were to be available. Naturally, it is not then possible to send a CQI feedback in every TTI but, for example given a threefold send, at best every third TTI.

However, if yet further CQI feedbacks are now sent in addition to the cyclical CQI feedbacks, then the possibility exists of a repetition of a non-cyclical CQI feedback colliding with a cyclical CQI feedback. This is disadvantageous because then either the additional CQI feedback or the cyclical CQI feedback cannot be repeated sufficiently frequently and the detection of the CQI feedback is thus impaired. In order to prevent this, a time interval is chosen between predetermined and additional CQI feedbacks such that no such collision can occur. To this end, the time interval must be chosen to be at least as large as the number of repetitions. This selection of minimum time intervals can also be performed without consideration for the activity status of the data transmission, in other words in the case of all non-predetermined CQI feedbacks.

The points in time of the predetermined, in particular cyclical, CQI feedbacks are also known to the transmitter during an active data transmission. On the other hand, the check for minimum intervals from the previous and following predetermined (in particular cyclical) CQI helps to avoid sending an unnecessarily large number of feedbacks and also any overlapping of transmissions of different CQI feedbacks. Furthermore, a priority of cyclical CQI feedbacks can be secured through suitable choice of these intervals. This is also indicated, amongst other things, for reasons of backward compatibility with earlier standard specifications. In this situation, minimum intervals from the cyclical CQI feedbacks are defined for non-cyclical CQI feedbacks, whereas no restrictions apply to the cyclical CQI feedbacks.

In another exemplary embodiment, minimum intervals are also provided between non-cyclical CQI feedbacks. These minimum intervals must be at least as large as the number of repetitions of an individual non-cyclical CQI feedback. It is also possible to choose larger minimum intervals however. For example, a minimum interval can be chosen such that a maximum of one CQI feedback is sent, or at most on each third TTI. Although each CQI feedback is sent without additional repeats, this serves to prevent CQI feedbacks from being sent more frequently than the channel is capable of changing significantly. In this case, it would be superfluous to send a CQI feedback for each TTI. This exemplary embodiment can be combined with all the methods for sending CQI feedbacks, which were listed at the beginning under the description of the prior art under 1 to 4. This combination too would be independent of the activity statuses of the data transmission.

Figure 4:
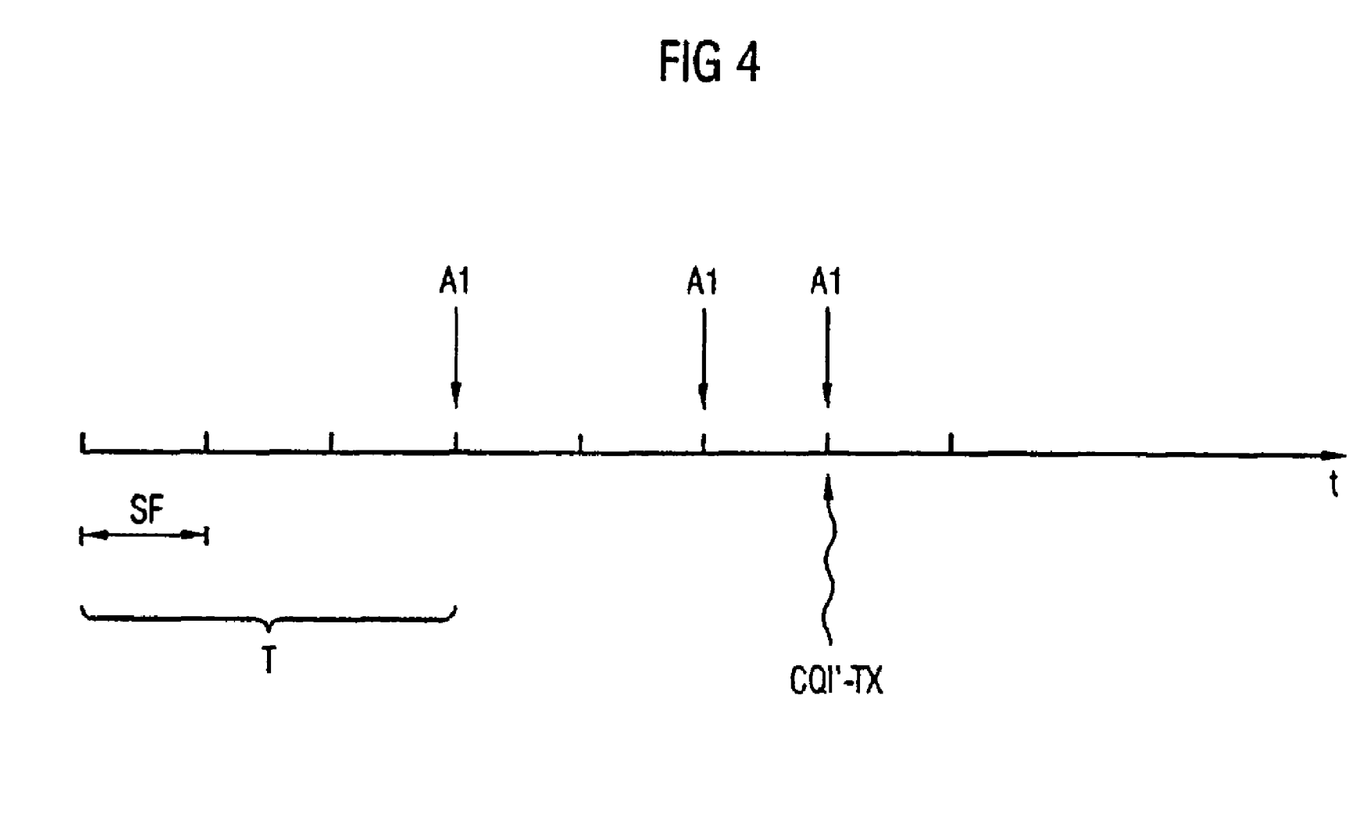
FIG. 4 illustrates the timing sequence for the transfer of channel quality information when only every n-th set of channel quality information is transferred in accordance with an exemplary embodiment.

Another exemplary embodiment specifies that not every additional CQI feedback is sent but only every n-th, where n represents a natural number. In other words, every third for example. If packets are sent to the terminal in each TTI, then this method is equivalent to the previous embodiment when using the activity based CQI feedback (described under prior art method 1). Otherwise, fewer CQI feedbacks are generated by this embodiment, however. This situation is illustrated in FIG. 4. The limits of a subframe SF are identified by marks on a time axis t. The specified first time interval corresponds to a period of time T, which corresponds to the length of 3 subframes in FIG. 4.

In FIG. 4, a check is now performed to determine whether a particular first activity status exists, for example a current transmission. The points in time at which this first activity status Al exists are identified by arrows. In the embodiment illustrated in FIG. 4, an additional channel quality information item is only transferred within the framework of a message CQI'-TX if the activity status has occurred 3 times. Instead of the number 3, any other desired natural number can also be chosen. As a result of this additional condition (stating that the activity status has occurred n times) the transfer of the channel quality information can be matched even more flexibly to the current transmission situation and in particular further—not necessarily required—transfer capacities can be saved.

In another exemplary embodiment, provisions are made for sending the first CQI feedback at the start of a data transmission, but then only every n-th further CQI feedback. This course of action ensures that an updated value is available at the start of a data transmission but only a few CQI feedbacks are sent during the data transmission. As a result, less interference is generated than is the case with the methods according to the prior art (i.e., 1 to 4).

This embodiment can for example be implemented by measuring the period of time T since the last transmission of the last CQI feedback and in addition the number of the occurrence of the activity status under consideration. In contrast to the previous embodiment, a CQI feedback is however not sent if both the period of time T and also the number of the occurrence of the activity status under consideration exceeds a predefined threshold, but it is sent if only one of these parameters exceeds the threshold. The timing threshold will not be exceeded during a data transmission but the number of the occurrence of the activity status under consideration will be. The start of a data transmission will generally be characterized in that no data has previously been transferred for a certain time and that the activity status under consideration did not occur. This is however only one possible implementation of this embodiment.

The possibility also exists of even choosing different intervals for the cyclical CQI feedback in the different statuses. However, it is not only possible to use shorter intervals for times of data activity with the aim of reducing the interval of the cyclical CQI feedbacks during the data transmission. By using the exemplary method proposed here, it is also possible to increase the interval of the cyclical CQI feedbacks during the data transmission, or the cyclical CQIs can be entirely discontinued. Additional CQIs are available during the data activity, for example according to prior art method 2 when a NAK is sent, which enables a substantially higher correlation between a change in the receive quality and the point in time of the CQI feedback when compared with the predetermined cyclical CQI feedbacks.

To summarize, the exemplary embodiments described above yield an extremely flexible instrument for controlling the CQI feedback. During inactivity on the data channel, it is possible should the occasion arise to receive information about the channel status of a user by means of cyclical CQI feedback. At the start of a data transmission, an updated value is transferred as quickly as possible unless such a value is present in the immediate temporal vicinity. An explicit request for a CQI feedback is dispensed with on account of the disadvantages associated with this, in particular the resource allocation in the downlink direction. Furthermore, different activity statuses of the data transmission channel are differentiated when executing the CQI feedback, whereby in particular the statuses "no active data link", "start of an active data link" and "active data link exists" are used.

Consideration can also be given to transferring a further channel quality information item (CQI-TX) from the receiver (R) to the transmitter (S) if either a first activity status exists and the time interval (t delta) from the last completed transfer of channel quality information (CQI-TX) exceeds a specified first time interval, or a first activity status exists and this status has already occurred n times.

It should be understood that various changes to the specification and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A method for transmitting data between a transmitter and a receiver via a transmission channel in a communications network for achieving wireless transmission, comprising:
   transferring repeatedly channel quality information from the receiver to the transmitter;
   determining an activity status for the data transmission by the receiver;
   determining a time interval from the last completed transfer of channel quality information;
   transferring a further channel quality information item from the receiver to the transmitter when a first activity status exists and the time interval exceeds a defined first time; and
   transferring an individual channel quality information item more than once in identical form, and choosing a time interval between these two transfers such that it is at least equal to a period of time which is required in total for the multiple identical transmissions of the channel quality information.

2. The method according to claim 1, wherein a repeated transfer of channel quality information takes place from the receiver to the transmitter, and individual channel quality information items are transmitted more than once in identical form, the defined first time interval being chosen such that no collisions occur between repeated transfers, further transfers of channel quality information or multiple identical transfers.

3. The method according to claim 1, wherein the transmitter is a base station and the receiver is a terminal, or vice versa.

4. The method according to claim 3, wherein the terminal has a transmit/receive unit for transmitting and receiving data over a radio path and a processor unit which is equipped for executing data transmission.

5. The method according to claim 4, wherein the base station has a transmit/receive unit for transmitting and receiving data over a radio path, having a link to a communications network and a processor unit which is equipped for executing a the method.

6. The method according to claim 5, wherein the communications network includes the terminal and base station.

7. The method according to claims 1, wherein the further channel information is sent if the first activity status has already occurred n times.

8. The method according to claim 7, wherein the predetermined points in time or the number n are predetermined by a transmitter in the form of a base station or/and by the communications network.

9. The method according to claim 1, wherein a time interval from the last completed transfer is ascertained and a transfer takes place if this time interval exceeds a defined first time interval.

10. The method according to claim 1, wherein the data transmission takes place in packet-switched fashion.

11. The method according to claim 1, wherein the activity status comprises a first status in which at least one data packet arrives at the receiver or its arrival is signaled and a second status in which no data packet arrives at the receiver and no arrival is signaled either.

12. The method according to claim 1, wherein the first time interval is defined depending on the activity status.

13. The method according to claim 1, wherein the repeated transfer of the channel quality information takes place at predetermined points in time.

14. The method according to claim 1, wherein the repeated transfer takes place cyclically at least in part.

15. The method according to claim 1, wherein the channel quality information is ascertained by way of at least one measurement, in particular immediately before a transfer of channel quality information in the receiver.

16. The method according to claim 1, wherein the communications network is a mobile radio network which functions in accordance with the UMTS standard and the data transmission method in question is HSDPA.

17. A method for transmitting data between a transmitter and a receiver via a transmission channel in a communications network for achieving wireless transmission, comprising:
   transferring repeatedly channel quality information from the receiver to the transmitter;
   determining an activity status for the data transmission by the receiver;
   determining a time interval from the last completed transfer of channel quality information;
   transferring a further channel quality information item from the receiver to the transmitter when a first activity status exists and the time interval exceeds a defined first time interval; and
   determining a time interval to the next predetermined transfer of channel quality information and if this time interval falls below a second defined time interval the transfer of the further channel quality information does not take place.

* * * * *